(12) United States Patent
Kemp et al.

(10) Patent No.: US 8,248,436 B2
(45) Date of Patent: Aug. 21, 2012

(54) METHOD FOR GRAPHICALLY DISPLAYING PIECES OF MUSIC

(75) Inventors: Thomas Kemp, Esslingen (DE); Franck Giron, Waiblingen (DE)

(73) Assignee: Sony Corporation, Tokyo (JP)

( * ) Notice: Subject to any disclaimer, the term of this patent is extended or adjusted under 35 U.S.C. 154(b) by 387 days.

(21) Appl. No.: 12/534,550

(22) Filed: Aug. 3, 2009

(65) Prior Publication Data

US 2010/0053168 A1 Mar. 4, 2010

(30) Foreign Application Priority Data

Aug. 27, 2008 (EP) .................................... 08015148

(51) Int. Cl.
G09G 5/00 (2006.01)
(52) U.S. Cl. ..................... 345/619; 345/440; 345/440.1; 345/440.2; 345/581
(58) Field of Classification Search .................... None
See application file for complete search history.

(56) References Cited

U.S. PATENT DOCUMENTS

| | | |
|---|---|---|
| 2004/0267736 A1 | 12/2004 | Yamane et al. |
| 2005/0211077 A1 | 9/2005 | Kobayashi |
| 2006/0202994 A1 | 9/2006 | Chevallier et al. |
| 2007/0157795 A1 | 7/2007 | Hung |
| 2008/0005688 A1 * | 1/2008 | Najdenovski ............... 715/765 |

FOREIGN PATENT DOCUMENTS

| | | |
|---|---|---|
| EP | 1 244 093 A2 | 9/2002 |
| EP | 1 489 617 A1 | 12/2004 |
| EP | 1 587 003 A2 | 10/2005 |
| EP | 1 615 204 A1 | 1/2006 |

OTHER PUBLICATIONS

Fabian Moerchen, et al., "MusicMiner: Visualizing timbre distances of music as topographical maps", Technical Report No. 47, Dept. of Mathematics and Computer Science, University of Marburg, XP002513980, May 18, 2005, 51 pages.

Marta Tolos, et al., "Mood-based navigation through large collections of musical data", Consumer Communications and Networking Conference, XP010787613, 2005, 5 pages.

Chinese Office Action issued Nov. 24, 2011, in Patent Application No. 200910168355.0 (English-language translation only).

Office Action issued Feb. 29, 2012, in European Patent Application No. 08 015 148.3.

Office Action issued Feb. 13, 2012, in Chinese Patent Application No. 200910168355.0 (with English-language translation).

* cited by examiner

Primary Examiner — Kee M Tung
Assistant Examiner — Jwalant Amin
(74) Attorney, Agent, or Firm — Oblon, Spivak, McClelland, Maier & Neustadt, L.L.P.

(57) ABSTRACT

A Method for graphically displaying pieces of music on a screen, comprising: providing a plurality of pieces of music, each piece of music having a music attribute; calculating a mapping function that maps values of said music attribute to coordinate values of a dimension of said screen; determining, for each of said pieces of music, a respective coordinate value based on said mapping function and a respective value of a respective music attribute; displaying on said screen a graphical symbol representing a respective piece of music at said respective coordinate value of said dimension.

14 Claims, 12 Drawing Sheets

METHOD FOR GRAPHICALLY DISPLAYING PIECES OF MUSIC

An embodiment of the invention relates to a method for graphically displaying pieces of music on a screen. A further embodiment of the invention relates to a portable device. A still further embodiment relates to a graphical user interface.

BACKGROUND

Nowadays, large musical databases, i.e. databases with a large number of pieces of music, are widely available. It may, however, be cumbersome for the user to get a good overview of the music collection and/or to make a good selection of a song to listen to.

It is an object of embodiments of the invention to provide a method for graphically displaying pieces of music on a screen that helps the user to recognize and/or select a desired piece of music in a large music database. It is a further object of the invention to provide a respective portable device and graphical user interface.

The objects are solved by a method according to claim 1, and a portable device.

Further details of the invention will become apparent from a consideration of the drawings and ensuing description.

BRIEF DESCRIPTION OF THE SEVERAL VIEWS OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following, embodiments of the invention are described. It is important to note, that all described embodiments in the following may be combined in any way, i.e. there is no limitation that certain described embodiments may not be combined with others. Further, it should be noted that same reference signs throughout the figures denote same or similar elements.

It is to be understood that other embodiments may be utilized and structural or logical changes may be made without departing from the scope of the invention. The following detailed description, therefore, is not to be taken in a limiting sense, and the scope of the present invention is defined by the appended claims.

Figure 1:
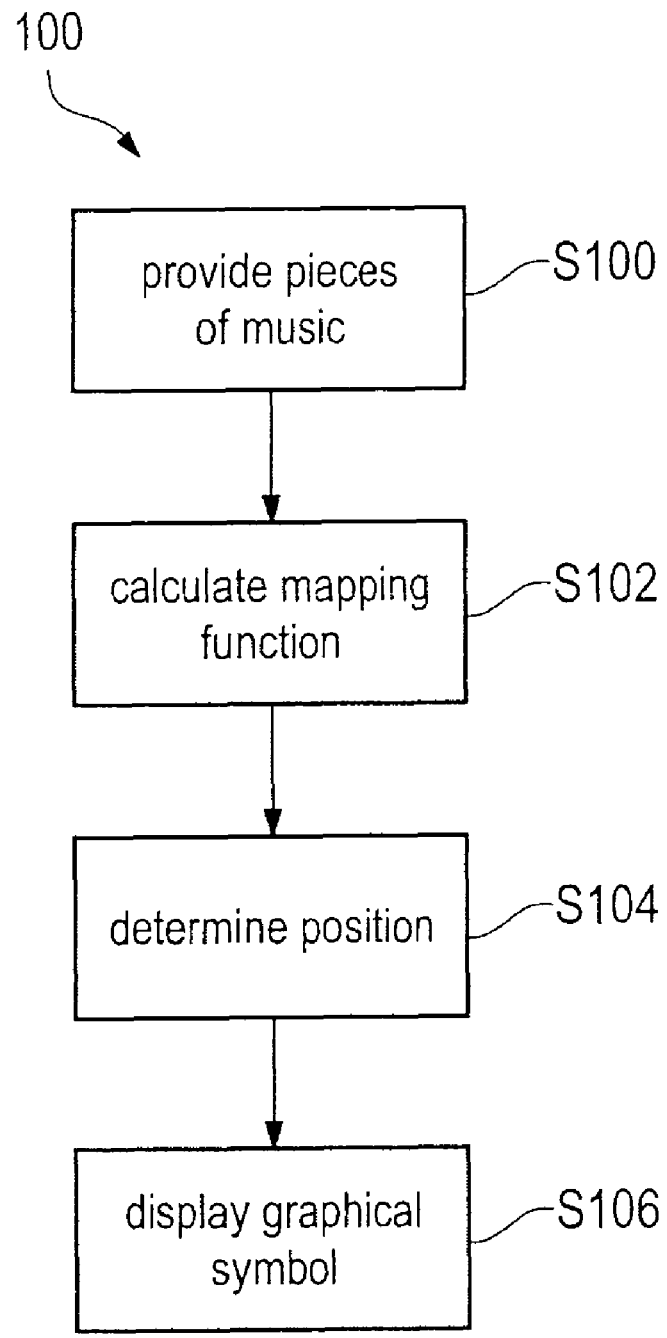
FIG. 1 shows a block diagram of a method according to an embodiment of the invention.

FIG. 1 shows a method 100 as an exemplary embodiment of a method for graphically displaying pieces of music on a screen. The screen might e.g. be a screen of a handheld device such as a mobile phone having a music playback function or a mobile device specifically adapted to playback music. The screen may, however, also be the screen or window of an application running on a computer.

The device on which the method may be run may, therefore, have a storage for storing a plurality of pieces of music. Thus, at S100 a plurality of pieces of music, e.g. at least three or more pieces of music, may be provided, wherein each piece of music has a music attribute. The music attribute may also be referred to as meta data or content descriptive data. Examples of music attributes are e.g. the genre of a piece of music (song), beats per minutes (bpm), the mood of the piece of the music, and so on. Examples of a genre are e.g. jazz, classical, ballade, pop, rock or more fine grained genres such as e.g. acid jazz, classical jazz, and so on.

In order to give the user an overview of the pieces of music stored in the storage, it is desirable to make optimum use of the available screen or window size. By displaying the pieces of music as text e.g. with titles, only a few pieces of music can be displayed e.g. if the screen size is limited. Moreover, additionally displaying information about music attributes makes this situation even more severe.

Therefore, it may be advantageous to graphically display the pieces of music e.g. by dots in a mood/speed space where along one axis the speed (beats per minute) of songs is applied and on a further axis the mood (sad/happy).

However, even graphical representation of the pieces of music has limitations on limited screen size. In the above example of a mood/speed space, if a music collection of a user comprises mainly slow songs, the majority of graphical symbols will be located close to each other.

Therefore, it is desirable to find user friendly ways of graphically displaying pieces of music even with limited screen size.

For this reason, at S102, a mapping function may be calculated that maps values of a music attribute of a respective piece of music to a dimension of the screen (window). For example, values of beats per minutes (music attribute) may be mapped onto a first dimension of the screen, e.g. a horizontal x-dimension (direction) of screen. Another example might be the degree of the mood, e.g. if a piece of music is a sad or happy song. Such an attribute might be mapped onto second y-dimension of the screen (vertical dimension, i.e. a direction extending vertically on the screen).

Thus, a mapping function may map values of a music attribute of a respective piece of music to a coordinate value of a dimension of the screen.

Then, at S104, a position in said dimension may be determined for each of the pieces of music of the collection. Thereby, the position may be determined based on the mapping function and a respective music attribute of a piece of music for which a position in the dimension is to be calculated.

At S106, a graphical symbol representing a respective piece of music may be displayed on the screen at a respective position in the dimension.

As already indicated above, it is of course possible that each piece of music has a further music attribute, i.e. the piece of music may have two music attributes, wherein each of the two music attributes is allocated to a different dimension of the screen. In this case the method may further comprise calculating a further mapping function that maps values of the further music attribute to a further dimension of the screen, e.g. the above mentioned y dimension. Then, for each of the pieces of music a further position may be determined in the further dimension, wherein the further position is determined based on the further mapping function and a respective further music attribute of a piece of music to be graphically displayed. Thus, the two music attributes are mapped onto a position on the screen which is determined by two respective coordinate values of the screen.

Figure 2:
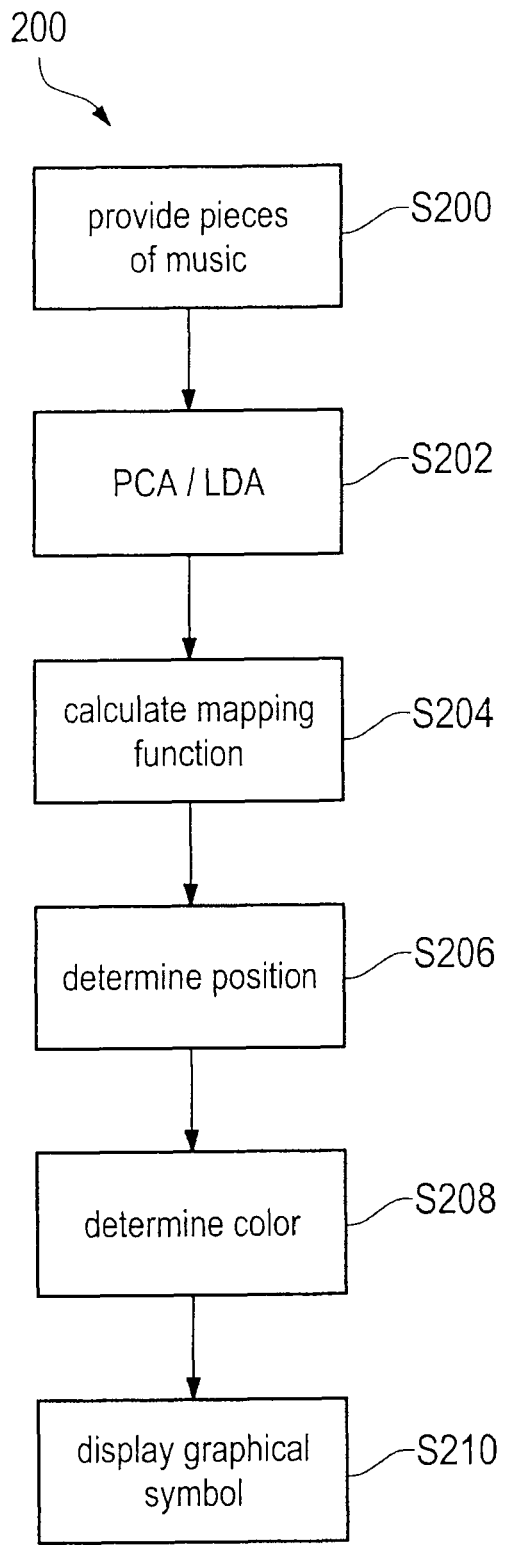
FIG. 2 shows a block diagram of a method according to a further embodiment of the invention.

FIG. 2 shows a further embodiment 200 of a method for graphically displaying pieces of music. In this embodiment, at S200, again pieces of music are provided. Then, at S202, a transformation based on values of music attributes of the pieces of music is calculated. A principle component analysis (PCA) transformation and/or a linear discriminant analysis (LDA) transformation may be applied. By such a transformation, clusters of graphical representations may be avoided (see also FIG. 7).

Then, at S204, a mapping function is calculated that maps the transformed music attribute values to respective positions (coordinate values) in a respective dimension of the screen. At S206, the position for the graphical representations (symbols), e.g. dots, triangles, squares and the like, is determined.

In order to further improve the utilization of screen size, it may also be possible to determine colors for the graphical symbols. Each color may represent information about a further music attribute. The color may e.g. represent the genre of a piece of music and may e.g. depend on a distance between features of the respective piece of music and reference genre model (see also FIGS. 9 and 10).

Then, at S210, graphical symbols in different colors may be displayed on the screen at the positions determined at S206.

Figure 3:
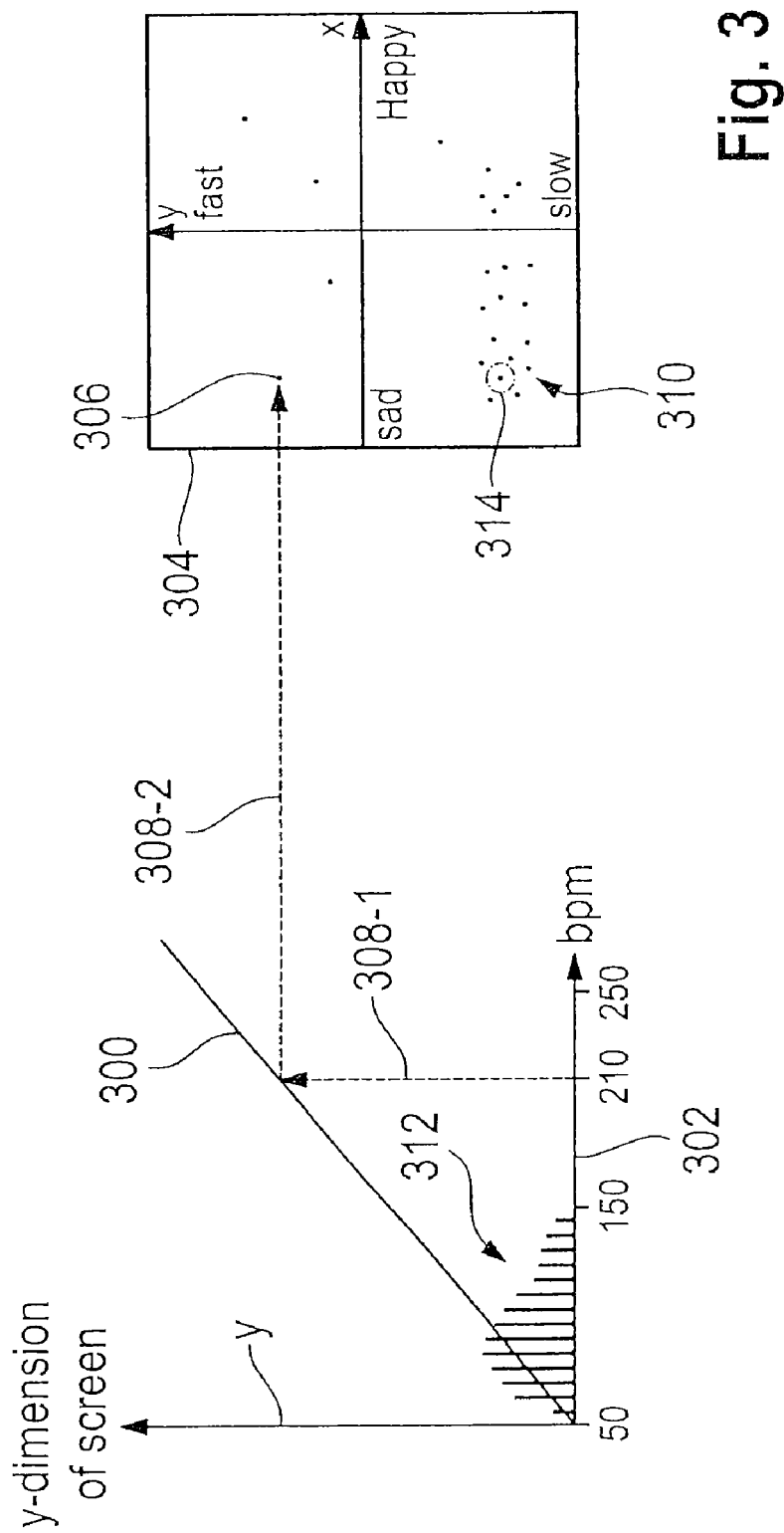
FIG. 3 shows a linear mapping function for mapping pieces of music onto a position in a dimension of a screen.

FIG. 3 shows an embodiment of a mapping function 300 that linearly maps values of a music attribute, in the example of FIG. 3 "beats per minute" (bpm), onto a dimension y of a screen 304.

The concept of the mapping function will be explained at hand of an exemplary piece of music 306 to be displayed on screen 304. In the example, it is assumed that piece of music 306 represented by a small dot on screen 304 has 210 bpm. In order to find the position (coordinate value) in dimension y of the screen 304, the coordinate value of y is determined as shown by arrows 308-1, 308-2.

A coordinate value of the x-axis of screen 304 may be determined in the same manner and represent a degree of the mood of piece of music 306. It is, however, not necessary that a mapping function be also used for dimension x. For example, if the distribution in x-dimension is even then it might be sufficient to only use a mapping function for determining the coordinate values in y-dimension. Of course, it is also possible the other way around, i.e. to use a mapping function for the x-dimension and non for the y-dimension.

The above explained concept of mapping function applies to all embodiments, in particular those described at hand of FIGS. 4 to 8.

Mapping function 300 is a linear mapping function. The linear mapping function 300 has the effect that the position on screen 304 of the pieces of music correspond to a "realistic" representation. In other words, the distribution 310 of the dots representing the pieces of music corresponds to the actual distribution of the attributes of the pieces of music. In the example, the music collection displayed on screen 304 comprises a majority of sad and slow songs.

The fact that the majority of songs are slow songs may also be seen from the histogram 312 where occurrences of values of beats per minute are summed up.

The representation of the music collection on screen 304 thus enables a user to get an idea of the kind of music he has stored on his device. The example on screen 304 reveals that the user has a majority of sad and slow songs. In order to make a selection of a song that the user wants to listen to, there may be provided a graphical user interface with a selector 314. The selector 314 may be controlled by a joystick type input device or any other suitable input device typically used for moving cursors/pointers or the like on a screen. As can be seen in the example of screen 304, it may be difficult for the user to actually see where the selector 314 is located. This may be more severe in regions with a high density of graphical symbols.

In order to better be able to position the selector 314 and/or in order to better utilize the screen size of screen 304, a different mapping function may be used.

Figure 4:
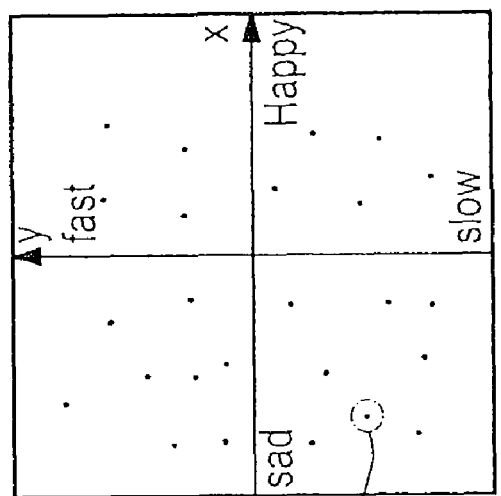
FIG. 4 shows a further mapping function for mapping pieces of music onto a position on a screen.
Figure 4:
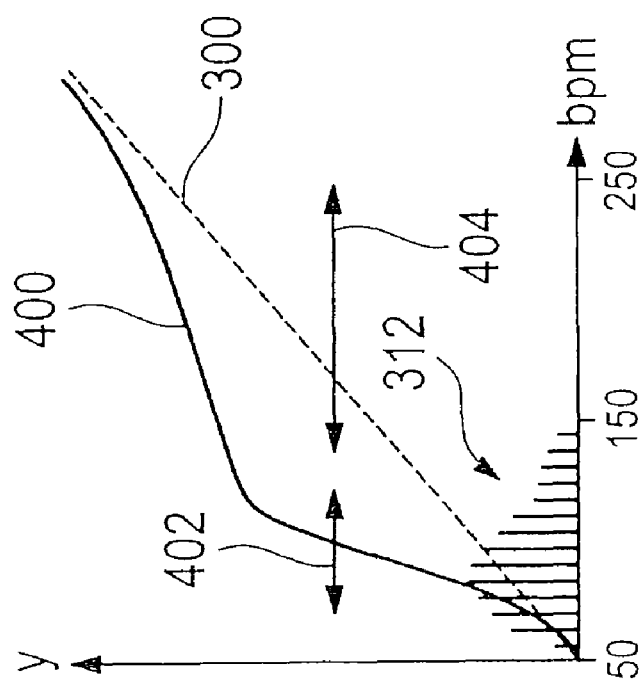

For example, a mapping function 400 as shown in FIG. 4 may be used.

The example of FIG. 4 is for the same music collection as that of FIG. 3. Thus, the distribution 312 of values of bpm is the same as in FIG. 3. However, in order to determine the position (coordinate values) of graphical symbols in the y dimension, the mapping function 400 is applied.

Mapping function 400 is thereby calculated depending on the actual user music collection. In order to determine mapping function 400 a cumulative probability density analysis may be performed. In other words, mapping function 400 is a cumulative probability density function (cumulative distribution function). This means that the slope of mapping function 400 depends on the histogram 312. The slope is larger in areas where a high number of occurrences of values of bpm occur. The slope is smaller in regions where fewer occurrences are located. In the example of FIG. 4, the slope is larger in a first range 402 of values of the music attribute (bpm) then in a second range 404 of values of the music attribute (bpm). This is because in the first range 402 more occurrences of the distribution 312 are located than in the second range 404.

The result of mapping function 400 is shown on the right hand side of FIG. 4. As can be seen, the distribution of dots representing different pieces of music is more even than in the view of FIG. 3. Thus, it may be easier for a user to place a selector 314 to a certain piece of music. Also, the screen size usage is optimized.

When applying mapping function 400, i.e. when a cumulative probability density function is used as mapping function, the screen size is optimally used. However, it might be desirable for certain applications and/or for usability, that the user still has a feeling about the "reality" of his music collection, i.e. about the actual (real) distribution of values of musical attributes. In the view of FIG. 4, as mentioned, the distribution is very even. Thus, the information that the collection actually has more sad slow songs is lost in the graphical representation.

This effect might be attenuated by using a combination of a cumulative probability density function and a linear mapping function e.g. a mean of the two function is calculated. A respective combined mapping function 500 is shown in FIG. 5.

Figure 5:
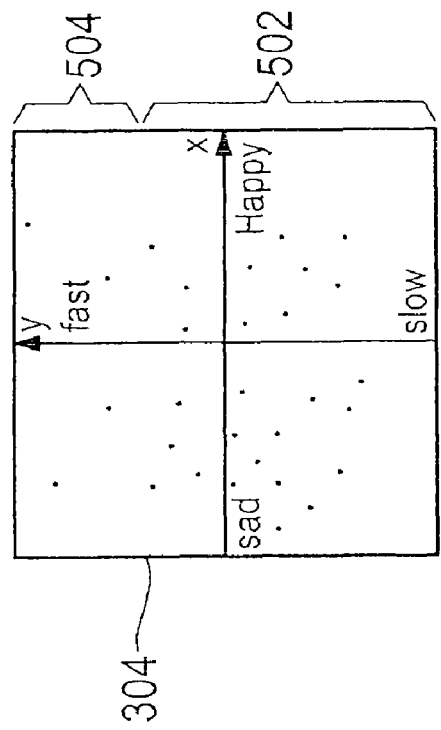
FIG. 5 shows still a further mapping function for mapping pieces of music onto a position on a screen.
Figure 5:
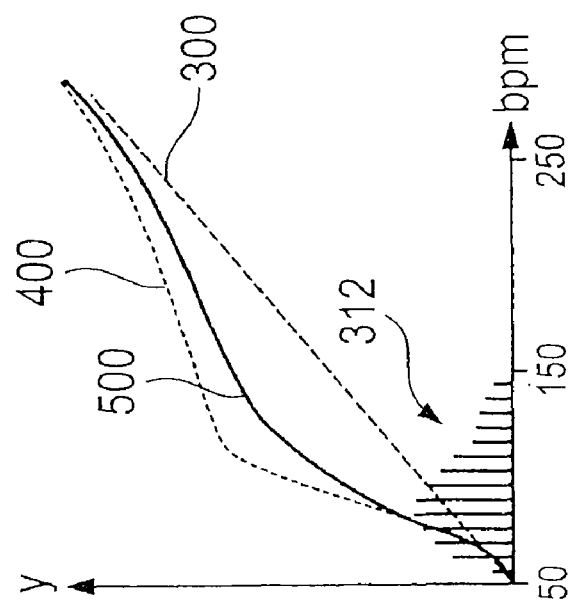

Further, on the right hand side of FIG. 5, the result of using mapping function 500 is shown. As can be seen, in a first region 502 of the screen, the density of graphical symbols is higher than in a second region 504. Still, the distribution in region 502 is more even than in FIG. 3. Thus, using an interpolation of a cumulative probability density function and a linear mapping function combines the advantages of using a linear mapping function where the user gets information about the "reality" (real distribution) and the more even distribution shown in FIG. 4 determined by using a cumulative density function.

Figure 6:
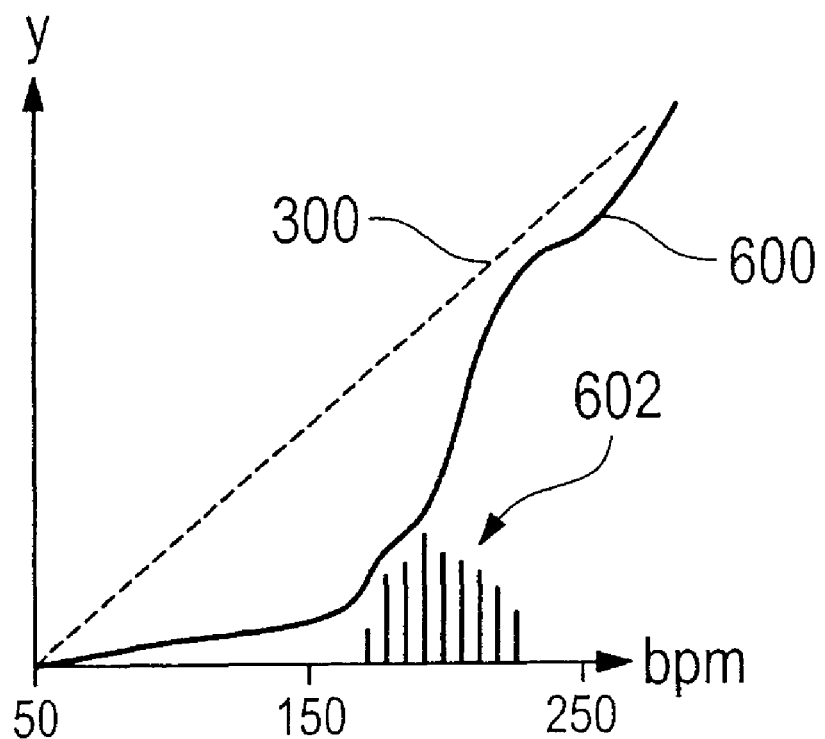
FIG. 6 shows still another mapping function for mapping pieces of music onto a position on a screen, wherein the mapping function is for another user than that of FIG. 3 to 5.

The examples of FIG. 3 to 5 are for the same music collection e.g. of one user. Thus, the distribution 312 is the same for FIG. 3 to 5. In FIG. 6, a distribution 602 of another music collection, e.g. from another user is shown. As can be seen, a respective mapping function 600 which depends on the music collection for which the histogram 602 is shown is different from the mapping functions shown in FIG. 3 to 5. Thus, also for the distribution 602 in FIG. 6, the screen size of the screen 304 may be optimally used. The described method, therefore, enables an optimum use of screen size independent from a user.

With respect to the choice of the mapping function, it should also be noted that it is possible that the mapping functions be optimized depending on the graphical user interface, e.g. size of pointers or other constraints. Nevertheless, in order to benefit from a more even distribution, generally speaking the slope of the mapping function should be high in regions/ranges where the values of the respective music attributes have a high number of occurrences. In other regions/ranges with fewer occurrences, the slope might be smaller.

Figure 7:
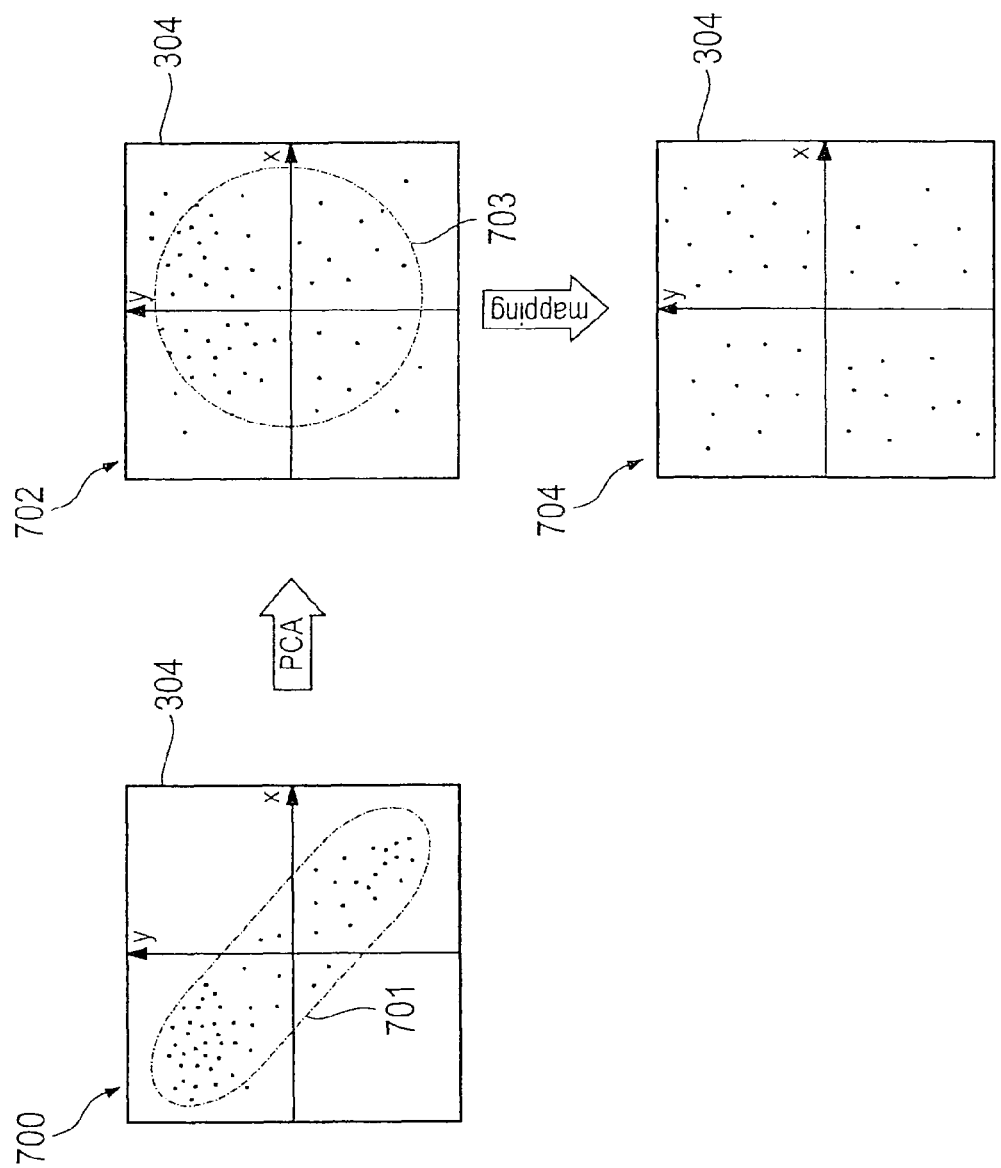
FIG. 7 shows a mapping with a preprocessing transformation applied before the mapping.

FIG. 7 shows a further possible embodiment where prior to applying a mapping function, a principle component analysis is performed, i.e. the values of the music attributes are subjected to a PCA (or alternatively to an LDA) transformation. As seen in the screen view 700, a distribution 701 may occur for a given music collection (without PCA or mapping). In such a case, the screen size is not used optimally since large areas of the screen do not contain any graphical symbols. In the example of FIG. 7, the screen view 700 shows that the music collection underlying the graphical representation comprises mainly sad fast songs and slow happy songs.

In order to achieve a better utilization of screen size, a principle component analysis (PCA) or alternatively and/or additionally, a linear discriminant analysis (LDA) transformation may be applied. The result is shown in screen view 702 showing a more even distribution 703 of the graphical symbols. Still, however, in the view of diagram 702, the screen size is not used optimally since in the upper half of screen 304 the density is much higher than in the lower half.

In order to get a still better distribution, the above explained mapping function may be applied. The result is shown in screen view 704 where it can be seen that the distribution is now more even than in screen view 702.

Thus, the combination of using a PCA/LDA transformation and additionally using a mapping function has a clear synergistic effect in that the screen size is optimally and adaptively used depending on the actual music collection.

Figure 8:
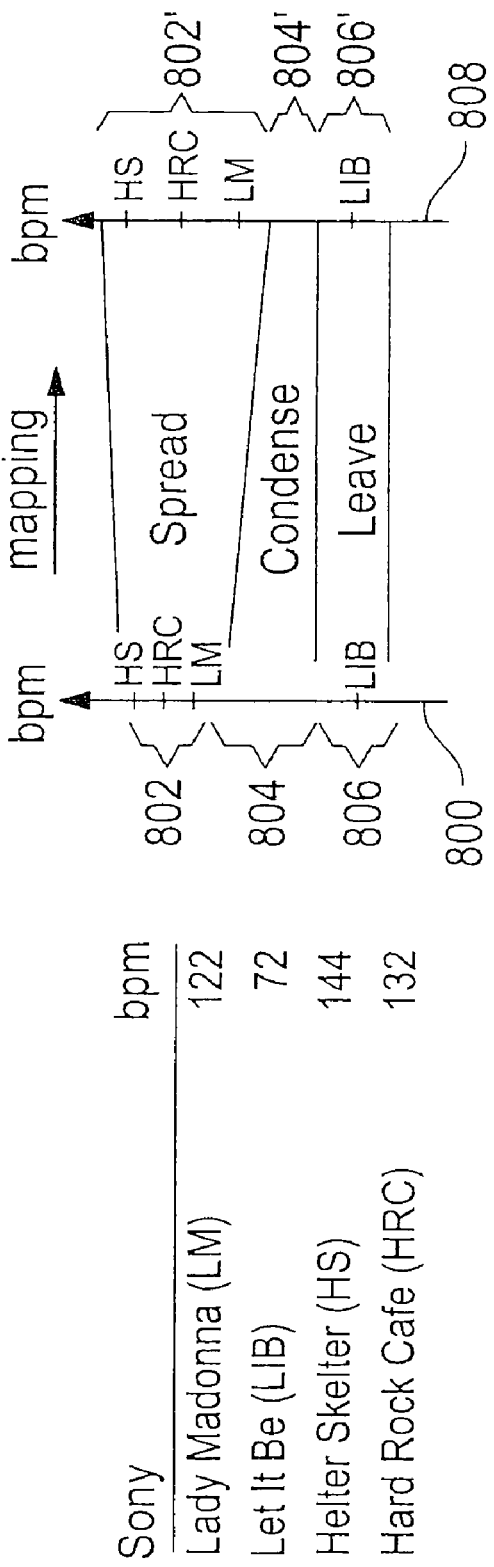
FIG. 8 shows an example illustrating the mapping in one dimension.

FIG. 8 shows a further example where a mapping function is applied for a graphical representation in only one dimension. In the table of FIG. 8, different songs are listed together with corresponding values of bpm. The different songs are represented by respective marks on an axis 800 (one-dimensional representation). Along axis 800 songs are graphically represented according to their bpm value. As can be seen, in a region 802 the majority of songs are represented. In another region 804, no song is represented and in a further region 806, only one song is present.

In order to achieve a more even distribution of the representations, a mapping function as explained above may be applied. Therefore, in a resulting representation on axis 808, a more even representation is shown. As shown, the region 802 is spread by the mapping to result in a region 802'. Further, region 804 is condensed by the mapping to result in region 804', and the region 806 is essentially not modified.

Figure 9:
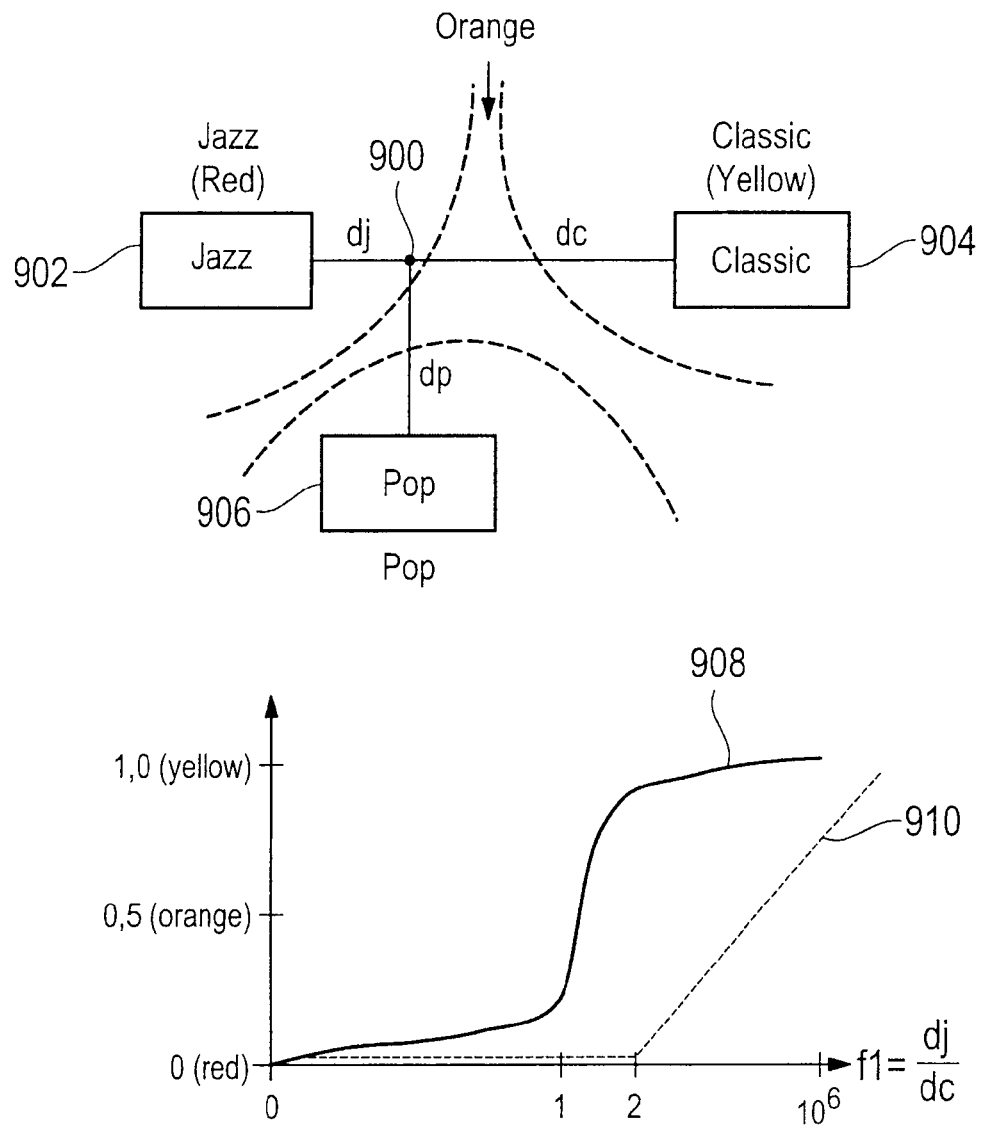
FIG. 9 shows an example of a genre-color mapping function.

At hand of FIGS. 9 and 10, a further feature will be explained. In order to further make optimum use of the screen size and give the user further information about his music collection, the graphical representations may contain color information. The color of a graphical symbol may e.g. inform the user of a further musical attribute of the respective piece of music. For example, color may be used to indicate the genre of a piece of music.

In order to determine the genre of a piece of music, known methods may be applied. For example, distances of features of a respective piece of music may be calculated with respect to a reference genre model. For example, in FIG. 9 in order to determine the genre of piece of music 900, the distances dj, dc, dp are calculated. dj is the distance to a reference model for jazz music. Further, dc denotes the distance to a reference model for classical music and dp denotes the difference to a reference model for pop music.

In the following example, jazz songs are displayed in red color and classical songs in yellow color. Thus, in order to determine a color for a graphical symbol, the quotient f1=dj/dc may be calculated. This might, however, result in an even distribution of the colors. In other words, this would result in a gradual color scheme. Songs that are somewhere in between jazz and classic might, therefore, be displayed in orange. However, a user might have difficulties in distinguishing between orange and red and orange and yellow, respectively.

In order to avoid a large number of orange representations, the concept of mapping functions may again be used. However, in this case, mapping functions having the form of a sigmoid function may be used. An example of such a sigmoid function 908 is shown in the lower part of FIG. 9. Mapping function 908 will result in a low number of graphic representations in the color of orange and a large number of graphical symbols displayed in either red or yellow. Thus, it is easier for the user to judge the distribution of genres in his music collection since the majority of songs will be displayed either in red or yellow (assuming that the collection includes mainly jazz or classical songs).

If the user desires more fine grained information of songs of a certain genre, the user might apply a "color filter". For example, the user might desire more fine grained information about his classic songs. In this case the mapping function may be changed, for example a mapping function 910 shown in FIG. 9 may be used. Then all jazz songs may be displayed in red and classical songs are displayed in shades from red to yellow.

Figure 10:
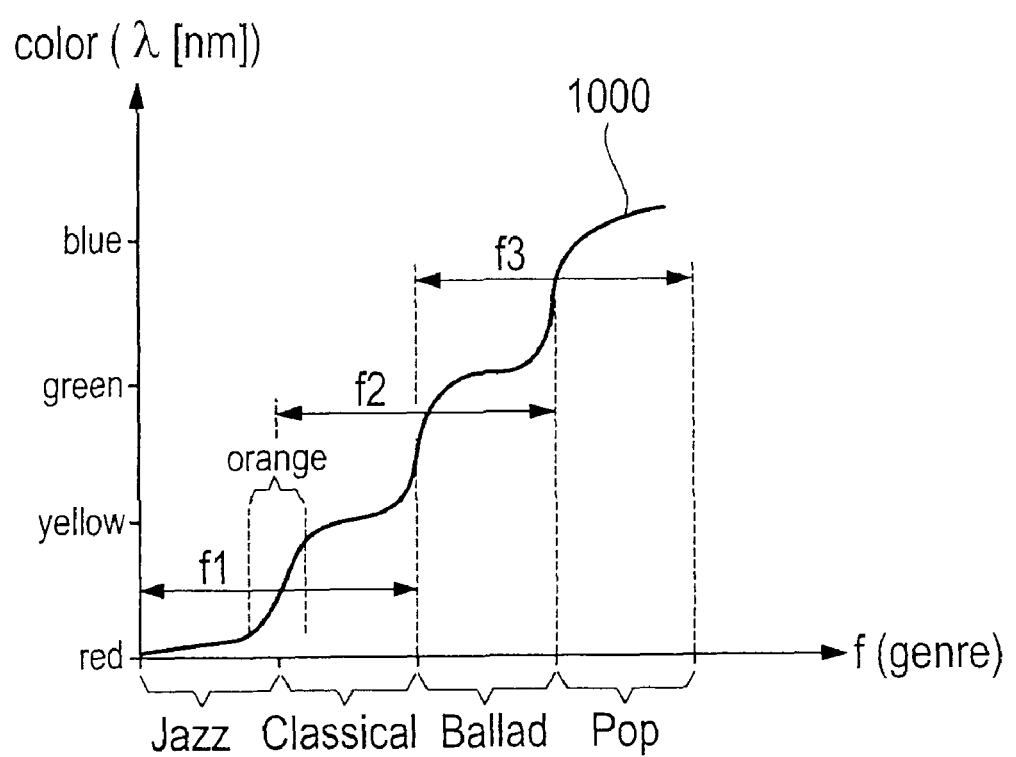
FIG. 10 shows a further genre-color mapping function for a plurality of genres.

FIG. 10 shows a further example how a mapping function may be used in connection with genres as music attribute. The shown mapping function 1000 is a concatenation of several sigmoid functions, wherein the input values for the mapping function is determined as shown in FIG. 9, i.e. as respective quotients f1, f2, f3.

Usage of the mapping function 1000 will result in the majority of graphical symbols having red, green or blue color. Only few graphical symbols will have in between colors like e.g. orange. Thus, the slope of the mapping function for "in between colors" is steep whereas it is low for red, green and blue colors.

As it is easier for a user to differentiate between red, green and blue colors, usability will be enhanced.

Figure 11:
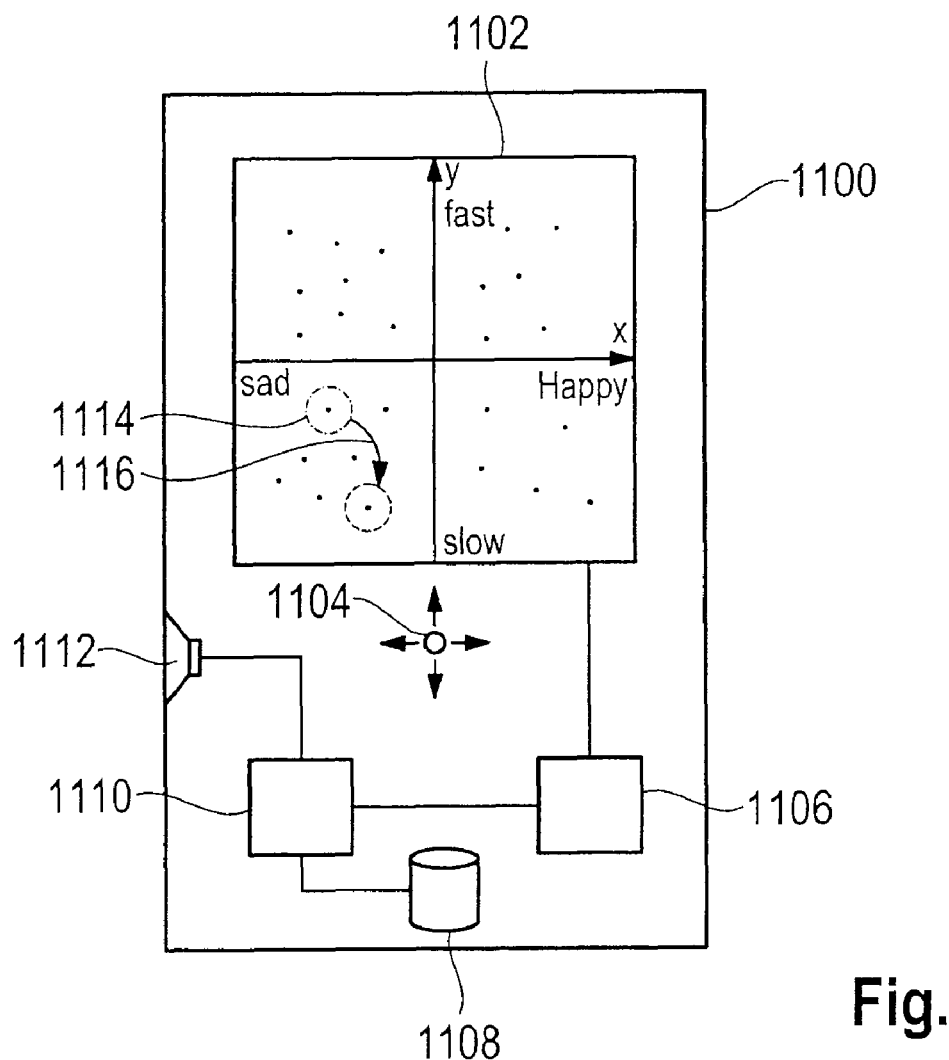
FIG. 11 shows an embodiment of a portable device.

FIG. 11 shows an embodiment of a portable device 1100. A portable device 1100 has a screen 1102, input means 1104, a graphical processor 1106, a storage 1108, a data processor 1110 and a loudspeaker 1112. On screen 1102, a graphical representation of a music collection stored on storage 1108 is displayed.

Thereby, data processor 1110 calculates a mapping function that maps values of music attributes (in the example of FIG. 11, mood and bpm) to a dimension of screen 1102. Data processor 1110 is further adapted to determine for each of the pieces of music a position (coordinate value) in the respective dimension x, y. Thereby, the position is determined based on the mapping function and the respective music attribute.

The graphical processor 1106 is adapted to receive the position and display on screen 1102 a graphical symbol, in the example of FIG. 11 these are dots, representing a respective piece of music at a respective position in the dimension x, y.

Portable device 1100 further has a graphical user interface 1114 that can be controlled by input means 1104. In order to select a piece of music for a playback via loudspeaker 1112, a user may operate input means 1104 which may e.g. be a joystick type input means, in order to move a selector of graphical user interface 1114. In the example of FIG. 11, moving of the selector is indicated by arrow 1116.

In a further embodiment, it is possible that the circle of the selector is larger and a plurality of symbols are located within the circle. In this case it is possible to create a playlist of songs located within the circle.

Figure 12:
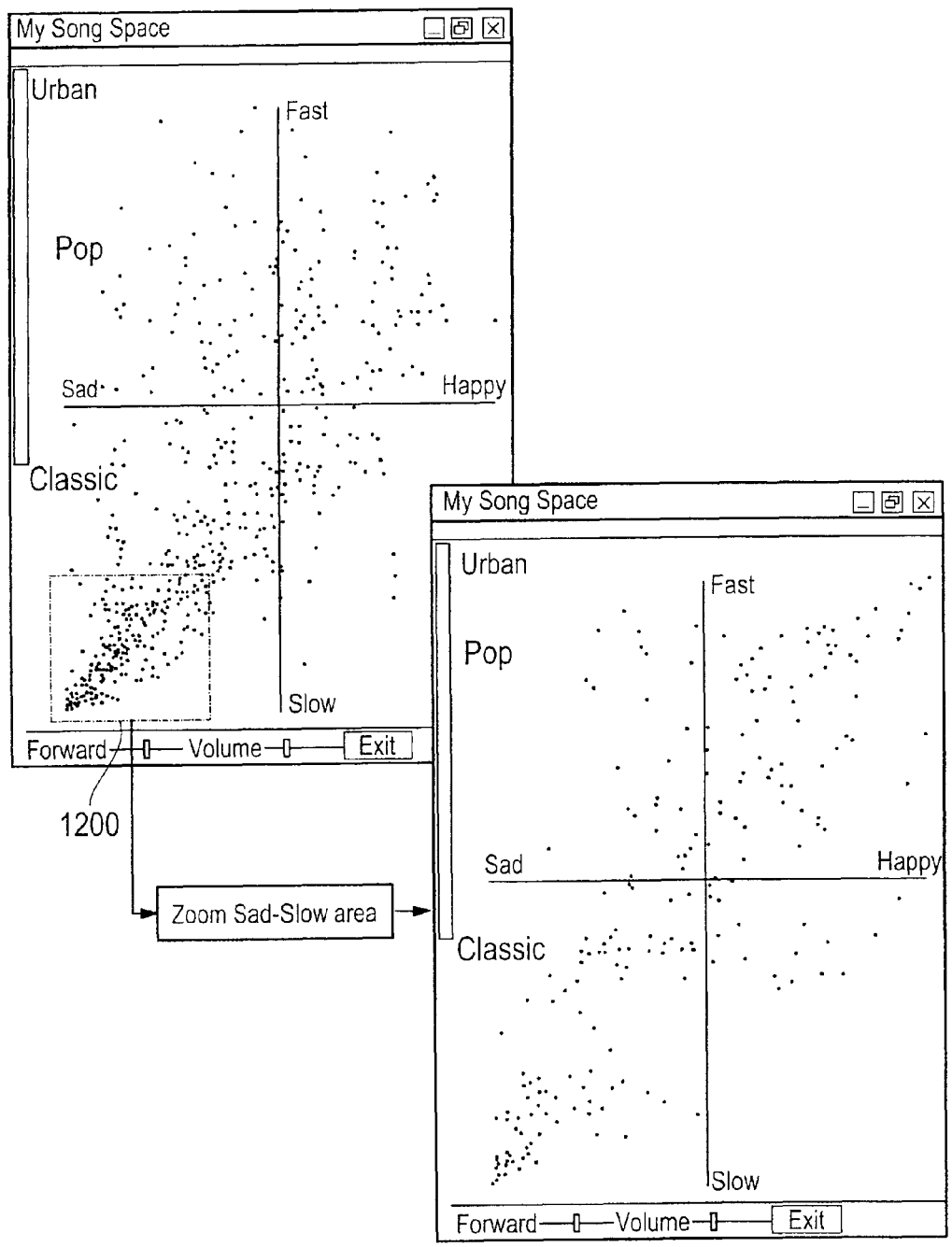
FIG. 12 shows a further example where a zoom is applied to a part of the screen.

FIG. 12 shows a further feature. Accordingly, it is possible to combine the concept of mapping function with a zoom view. The user might select an area 1200 that will then be enlarged. If combined with the concept of mapping, the zooming function further optimizes usage of the available screen size.

In the following, further embodiments are described:

It is possible to display songs stored on a portable (mobile phone) device in the form of a cloud of pixels on the screen as a 2 dimensional space. By using 5 keys of the device (left, right, up, down, selection (OK) buttons), which are also used for other browsing functionality in other menus, it is possible to navigate within this musical space. A circle is placed around one of the points (placed originally in the middle of the screen, when starting the application), and covering a limited number of songs around the centre of this circle. When using the moving keys, a song is selected in the corresponding direction and the song is played starting from some middle part of the song. By pushing the selection button, a playlist may be generated which contains all songs in the corresponding area of the circle.

The following explanations might further illustrate the proposed concept.

When displaying songs inside a 2d plane where the axes denote metadata dimensions such as happy/sad or slow/fast—a maximum of about 1000 songs may be used, or else, the screen is cluttered with information. In addition, as there are more dimensions to music than just the two, the undesired result that two adjacent songs in the 2d plane are actually very different along a third dimension occurs. For example, both a rap song and a piano ballad could be "slow and sad", but having them next to each other is irritating the user. To solve this problem a new UI concept may be introduced based on an intelligent data selector.

One of the basic problems of limited screen/window size is a good utilization of the screen space. The screen space may be increased by intelligent data selectors which work in the following way.

Firstly, for a given range of data (which could be all of the data, or a tempo range, say from 60 to 90 bpm (beats per minute)), the histogram of all metadata values (songs) that fall into that range may be determined. For example, there might be 22 songs with 60 bpm, 42 with 61, 19 with 62, and so on, but—for clarity of the explanation—let us assume that there are only 5 songs for all bpms larger than 75. This means, the vast majority of all songs is located in the lower half of the screen, leaving the upper half more or less un-used.

Intelligent data selectors will now re-scale the bpm axis in such a way that the distribution of the data on the screen is uniform. This is achieved by increasing (expanding) the resolution of the bpm axis if there are many data points in the corresponding bpm range, and decreasing (condensing) the resolution if there are few. In the example above, for a screen of a mobile device, the resolution in the 60 . . . 75 bpm range might be 50 screen pixels per bpm, resulting in 15*50 or 750 pixels for this range, and 10 screen pixels per bpm for the bpms from 75 to 90, resulting in 15*10 or 150 pixels for this other range. In total, of the 900 screen pixels, 750 are allocated for the bpms from 60 to 75, and only 150 for the rest.

This will result in an even spread of all points over the screen, making the use of the screen space much more efficient.

Also, a third dimension might be introduced, shown as colors. As a third dimension, a good choice could be musical genre. There are only a few main genre categories (e.g. Jazz), plus a lot of fine subgenres (cool jazz, acid jazz, . . . ). There are also some songs, but not so many, which are between genre categories. So, essentially, genre is a variable that takes on only a few broadly different values (e.g. 100 for pop, 200 for jazz, 300 for classical), with an additional smaller fine grained category superimposed to the values (e.g. pop ranges from 80 to 120, jazz from 180 to 220, classical from 290 to 310). This dimension might be shown coded as color, so e.g. 100 (actually everything between 80 to 120) is red, 200 (all between 180 to 220) is blue, and 300 is yellow.

If the user makes no selection, he will see all songs spread over all the screen. However, the spread is much more even because of the intelligent data selector applied, which will change resolution of the axes to spread out the data. Also, all colors are present. In navigation, the user is typically interested in navigating a part of the space, say all very "sad/slow" songs. Therefore, he might select the "sad/slow" region of the screen and zooms in. The intelligent data selector will now spread out the "sad/slow" songs again over all of the screen evenly (see FIG. 12), making navigation inside the "sad/slow" songs much easier. If a selection is done along the "fast/slow" axis, the same thing happens, resulting in a dynamically changing, but always roughly evenly filled screen space for the user. An example of such an interface for around 600 songs is given in FIG. 12, where the colors are used to represent different genres between classic and urban, the x axis is the sad-happy dimension and the y axis the slow-fast dimension. The original map is very dense in the slow-sad region. By applying the zooming functionality with the intelligent data selector (based on the mapping function), it is now possible to display a more expanded set of data points on the complete screen. In this way we can now display more easily the different type of songs, which were previously hidden by other songs.

For the color dimension, the user can employ the intelligent data selector also (a "color filter"), for example, to only see jazz songs. By putting the filter to "jazz only" (blue color filter), the intelligent data selector will again recompute a new variable axis resolution for the color axis for the remaining songs, that is, for all jazz songs. Rather than having "red" as "pop" and yellow as "classical", the meaning of the colors inside the jazz-zoom might be "red" for "cool jazz" and yellow for "bigband". Again, all three dimensions are fully utilized. However, for the color dimension, the dynamic resizing of the color axis might be done in a different way, namely, to put the songs into three (this example is not actually limited to three, but the number is not too high since for small pixels there are only a few colors which are easy to recognize) classes in a more or less even distribution, and re-scale the axis such that very few songs are put in the space between two colors. That means that the spread of the songs along the color dimension is still one that puts most songs into either red, or yellow, or blue, and only very few songs into orange (which is in between red and yellow, but difficult to see on a small screen).

It has to be noted that decorrelating the data before displaying it into a 2d display, namely by LDA or PCA transformation, may further improve the usability of the approach.

The color dimension does not have to be restricted to the genre. It is also possible to display e.g. a scale of energy for the songs or any other kind of musical attributes, which can be mapped into a number.

If the screen can be bigger, it is also possible to change the size (or form) of the "points" also in proportionality to some property of the songs. In this case, it is even possible to display more than 3 dimensions. E.g. the radius of a circle could be proportional to the energy of the sound and the color proportional to the genre, as mentioned previously. In this case the represented space would be 4 dimensional: The "Sad-Happy", "Slow-Fast", "Energetic-Calm" and "Genre" axis. Of course the role of each axis can be modified according to user preferences or device interface possibilities. It may be possible for example to use the color to display the happy/sad dimension or the x-axis for the energetic/calm dimension. It could be possible to also use different forms to model the music space, like triangle, rectangle, or other geometrical form.

Still further embodiments are:

A Method for graphically displaying pieces of music, comprising:
  providing a plurality of pieces of music, each piece of music having a music attribute;
  calculating a mapping function that maps each value of said music attribute to at least one of a dimension, a color of a graphical symbol representing a respective piece of music, and a brightness of a graphical symbol representing a respective piece of music;
  determining, based on said mapping function and said music attributes, at least one of a location, color and brightness of a respective graphical symbol representing a piece of music;
  displaying on a display a graphical symbol representing a respective piece of music at a determined location, in a determined color, and in a determined brightness, said determined location, said determined color, said determined brightness having respectively been determined in said step of determining.

A Method for graphically displaying pieces of music on a screen, comprising:
  providing a plurality of pieces of music, each piece of music having a first and second music attribute;
  calculating a first and second mapping function that respectively maps said first and second music attributes to a first and second spatial dimension of said screen;
  determining, for each of said pieces of music, a position on said screen, wherein said position is determined based on said first and second mapping functions and a respective music attribute,
  displaying on said screen a graphical symbol representing a respective piece of music at a respective position.

A Method for graphically displaying pieces of music on a screen, comprising:
  providing a plurality of pieces of music, each piece of music having a music attribute;
  calculating a mapping function that maps values of said music attribute to a position on said screen;
  determining, for each of said pieces of music, a respective position based on said mapping function and a respective music attribute;
  displaying on said screen a graphical symbol representing a respective piece of music at a respective position.

Although specific embodiments have been illustrated and described herein, it will be appreciated by those of ordinary skill in the art that a variety of alternative and/or equivalent implementations may be substituted for the specific embodiments shown and described without departing from the scope of the described embodiments. This application is intended to cover any adaptations or variations of the specific embodiments discussed herein. Therefore, it is intended that this invention be limited only by the claims and the equivalents thereof.

The invention claimed is:

1. A method for graphically displaying pieces of music on a screen, comprising:
  providing a plurality of pieces of music, each piece of music having a music attribute;
  calculating a mapping function that maps values of said music attribute to coordinate values of a dimension of said screen, the mapping function being user specific and determined based on the values of music attributes of pieces of music included in at least a part of a music collection of the user, a slope of the mapping function being larger where an occurrence of a value of the music attribute in the music collection is higher than where an occurrence of the value of the music attribute is lower;
  determining, for each of said pieces of music, a respective coordinate value based on said mapping function and a respective value of a respective music attribute; and
  displaying on said screen a graphical symbol representing a respective piece of music at said respective coordinate value of said dimension.

2. The method of claim 1, wherein each piece of music has a further music attribute, and said method further comprises:
  calculating a further mapping function that maps values of said further music attribute to further coordinate values of a further dimension of said screen, determining, for each of said pieces of music, a further respective coordinate value based on said further mapping function and a respective further value of a respective further music attribute, displaying on said screen said graphical symbol representing a respective piece of music at a respective further coordinated value of said further dimension.

3. The method of claim 2 wherein said values of music attributes and/or said further music attributes correspond to transformed values of music attributes having been transformed based on a principal component analysis (PCA) transformation or linear discriminant analysis (LDA) transformation.

4. The method of claim 2, wherein said values of music attributes and said further values of music attribute represent beats per minute and a degree of a music mood, respectively.

5. The method of claim 1 wherein the mapping function and/or further mapping function is/are determined based on a cumulative probability density function.

6. The method of claim 5, wherein the mapping function and/or further mapping function is/are determined based on a combination of said cumulative probability density function and a linear mapping function.

7. The method of claim 1, wherein the slope is larger for a first range of values of said music attributes/further music attributes than for a second range of values of said music attributes/further music attributes, wherein in said first range more occurrences of said distribution are located than in said second range.

8. The method of claim 1, wherein a color of the graphical symbol depends on the genre of the respective piece of music represented by the graphical symbol.

9. The method of claim 8, wherein the color depends on a distance between features of the respective piece of music and a reference genre model.

10. The method of claim 9, wherein the color depends on a genre-color mapping function that maps the distance or a derivative thereof to a color.

11. The method of claim 10, wherein the genre-color mapping function at least partly has the form of a sigmoid function.

12. The method of claim 10, wherein the color depends on a genre-color mapping function that maps a distance based measure to a color, said distance based measure corresponding to a quotient of a first distance between features of the respective piece of music and a first reference genre model and a second distance between features of the respective piece of music and a second reference genre model.

13. A non-transitory computer readable medium encoded with a computer program which when executed on a computer, causes the computer to perform a method according to claim 1.

14. A portable device, comprising:
a screen;
a storage adapted to store a plurality of pieces of music, each piece of music having a music attribute;
a data processor adapted to calculate a mapping function that maps values of said music attribute to coordinated values of a dimension of said screen, and further adapted to determine, for each of said pieces of music, a respective coordinated value in said dimension based on said mapping function and a respective value of a music attribute, the mapping function being user specific and determined based on the values of music attributes of pieces of music included in at least a part of a music collection of the user, a slope of the mapping function being larger where an occurrence of a value of the music attribute in the music collection is higher than where an occurrence of the value of the music attribute is lower; and
a graphical processor adapted to receive said coordinated value and display on said screen a graphical symbol representing a respective piece of music at a respective coordinated value in said dimension.

* * * * *